United States Patent
Yabe et al.

(10) Patent No.: US 11,302,914 B2
(45) Date of Patent: Apr. 12, 2022

(54) MAGNESIUM AIR BATTERY CAPABLE OF LONG-TERM POWER SUPPLY AND ELECTRONIC MACHINE

(71) Applicant: CIP SOFTWARE CORP., Tokyo (JP)

(72) Inventors: Takashi Yabe, Tokyo (JP); Kyoko Okemoto, Tokyo (JP)

(73) Assignee: MGR Energy LLP, Tokyo (JP)

( * ) Notice: Subject to any disclaimer, the term of this patent is extended or adjusted under 35 U.S.C. 154(b) by 0 days.

(21) Appl. No.: 16/469,592

(22) PCT Filed: Dec. 8, 2017

(86) PCT No.: PCT/JP2017/044134
§ 371 (c)(1),
(2) Date: Jun. 13, 2019

(87) PCT Pub. No.: WO2018/110444
PCT Pub. Date: Jun. 21, 2018

(65) Prior Publication Data
US 2019/0393498 A1     Dec. 26, 2019

(30) Foreign Application Priority Data
Dec. 13, 2016   (JP) .............................. JP2016-240919

(51) Int. Cl.
*H01M 4/46*   (2006.01)
*H01M 4/505*  (2010.01)
(Continued)

(52) U.S. Cl.
CPC ............. *H01M 4/46* (2013.01); *H01M 4/505* (2013.01); *H01M 10/441* (2013.01);
(Continued)

(58) Field of Classification Search
CPC ............ H01M 4/46; H01M 2/16; H01M 2/18; H01M 4/505; H01M 10/441;
(Continued)

(56) References Cited

U.S. PATENT DOCUMENTS 4,871,627 A * 10/1989 Strong ................... H01M 50/70
429/407
5,476,730 A * 12/1995 Okamura .............. H01M 12/06
429/405

(Continued)

FOREIGN PATENT DOCUMENTS

DE    102014208047 A1    10/2015
JP       4836966 Y1       11/1973
(Continued)

OTHER PUBLICATIONS

World Intellectual Property Organization, Application No. PCT/JP17/44134, International Search Report dated Mar. 13, 2018.

*Primary Examiner* — Lisa S Park
(74) *Attorney, Agent, or Firm* — Wong & Rees LLP; Kirk D. Wong (57) ABSTRACT

Thin magnesium plate 101, which contains metal magnesium, is enclosed by separator 102, which is made of fluid-permeable material and is used as magnesium fuel assembly 100 in magnesium battery 120 in this invention. Magnesium fuel assembly 100 is enclosed from both sides by cathode 103 and provided with electrolyte retention unit 106, which stores electrolyte 107, at its bottom. When magnesium fuel assembly 100 is pushed down from above, separator 102 is impregnated with electrolyte 107, thereby initiating the battery reaction.

11 Claims, 11 Drawing Sheets

(51) Int. Cl.
  *H01M 2/18* (2006.01)
  *H01M 2/16* (2006.01)
  *H01M 10/44* (2006.01)
  *H01M 12/06* (2006.01)
  *H01M 50/409* (2021.01)
  *H01M 50/463* (2021.01)

(52) U.S. Cl.
  CPC ....... *H01M 12/065* (2013.01); *H01M 50/409* (2021.01); *H01M 50/463* (2021.01)

(58) Field of Classification Search
  CPC .. H01M 12/065; H01M 16/00; H01M 2/1673; H01M 2/362; Y02E 60/10
  See application file for complete search history.

(56) References Cited

U.S. PATENT DOCUMENTS

| | | | |
|---|---|---|---|
| 6,355,369 B1 * | 3/2002 | Iarochenko | H01M 6/045 |
| | | | 429/404 |
| 2018/0090770 A1 * | 3/2018 | Park | H01M 12/08 |

FOREIGN PATENT DOCUMENTS

| | | |
|---|---|---|
| JP | H0251876 A | 2/1990 |
| JP | H07130406 A | 5/1995 |
| JP | 2015207494 A | 11/2015 |
| JP | 2016073112 A | 5/2016 |
| JP | 2016139543 A | 8/2016 |
| WO | 2016104133 A1 | 6/2016 |

\* cited by examiner

MAGNESIUM AIR BATTERY CAPABLE OF LONG-TERM POWER SUPPLY AND ELECTRONIC MACHINE

CROSS REFERENCE TO RELATED APPLICATIONS AND PRIORITY CLAIM

This application is a U.S. National Stage Patent Application filed under 35 U.S.C. § 371 based upon International Patent Application No. PCT/JP2017/044134 filed Dec. 8, 2017, which claims the benefit of Japanese Application 2016-240919, filed Dec. 13, 2016, the entire contents of all of which are hereby incorporated by reference as if fully set forth herein for all purposes.

TECHNICAL FIELD

The invention is related to a magnesium battery capable of prolonged supply of electricity and an electronic device

BACKGROUND

Developments in battery technology are making it possible to store larger amounts of electricity in the battery than ever before. This is giving rise to a growing demand for the development, for example, of electric vehicles that do not emit gases of environmental concern such as carbon dioxide or nitrogen oxide and batteries for use as large-capacity emergency power sources in disasters. After a disaster, it is estimated that it takes three days to restore electricity, during which time power supply is required. A power supply of 100 W to 1 kW is needed for household appliances such as televisions that serve as sources of information, refrigerators for preserving fresh food, electromagnetic cooking devices and rice cookers. In addition, while electric vehicles that use rechargeable batteries are advantageous from the standpoint of having minimum impact on the environment, at the present time, factors such as the distance a vehicle can run on a battery and the establishment of an infrastructure including charging stations where batteries can be recharged are proving to be stumbling blocks. For example, a 200 kW power source is required to charge a vehicle mounted with a 100 kW rechargeable battery in 30 minutes. Increases in the number of vehicles needing recharging will mean that charging stations will be occupied for 30 minutes for each vehicle. While it takes only three minutes to fill a gasoline tank at present-day filling stations, to recharge a rechargeable battery in the same three minutes would require a power supply of 2 MW for each vehicle.

As a method to resolve the above-outlined problems is the magnesium battery that uses oxygen in the air as the anode active material and magnesium as the cathode active material. Since, compared to an equivalent lithium-ion battery, the capacity of a magnesium battery can be increased, a 100 kW-class battery can fit comfortably into the trunk of a car. Moreover, sodium chloride solution (concentration: approximately 23%) can be used as the magnesium battery electrolyte, making the battery safe and usable in cold regions because the solution is known not to freeze even at −20° C. Patent Literature-1 shows a cartridge-type magnesium battery. The magnesium battery detailed in Patent Literature-1 incorporates a fuel assembly that includes magnesium in the form of a sheet wound onto a reel and electricity is generated when the reel is rotated so that the unused part of the fuel assembly works anew in concert with the anode at the same time as the post-reaction fuel assembly is collected. In addition, Patent Literature 2 shows a magnesium battery invention comprising a supply unit that supplies fuel, a battery unit where the battery reaction takes place and a waste unit that collects post-reaction fuel, wherein fuel is successively fed to the battery unit to realize a continuous battery reaction. In this invention, the magnesium that serves as fuel is impregnated in advance with electrolyte and wrapped in an electrolyte retention unit, and this is used as fuel to produce electromotive force.

OVERVIEW OF INVENTION

While these magnesium air batteries are capable of supplying electricity successively by replacing them with new fuels, installation in electric vehicles and use as emergency power sources, for example, will require a longer stable supply of power. Moreover, electrolyte supply will be important during prolonged supply of electricity. Since the magnesium batteries detailed in Patent Literature 1 and 2 use fuel impregnated with electrolyte, one issue will be the inability to perform stable battery reaction as the electrolyte evaporates. Furthermore, it is preferable that the fuel supply mechanism be as simple as possible and require no power source.

In other words, building a magnesium battery capable of prolonged supply of electricity requires that it be possible to supply water to the electrolyte over a prolonged period of time and that a new mechanism capable of independent supply of electricity over long periods of time to be used.

As the result of reflection on the issues concerned, the purpose of this invention is to provide a magnesium battery and electronic device cable of the prolonged supply of water to the electrolyte and independently supplying electricity over long periods of time.

Means of Resolving Issues

Realization of the foregoing purpose requires that the magnesium r battery relating to the first perspective of the invention comprises a fuel assembly comprising a thin magnesium plate incorporating magnesium, a liquid-permeable separator made of ion-permeable material and a negative terminal, a positive terminal with a cathode arranged so that it encloses the above magnesium fuel assembly from both sides, electrolyte, and an electrolyte retention unit with a space in which the aforementioned electrolyte is retained.

The features of the foregoing magnesium battery shall be that only the aforementioned magnesium fuel assembly is impregnated with the above electrolyte, the aforementioned separator being impregnated by capillary action.

The aforementioned magnesium battery shall be provided with two or more of the aforementioned fuel assemblies, which shall be shared by the aforementioned electrolyte retention unit.

Of the aforementioned electrolyte retention unit and magnesium fuel assembly, at the very least, one can be furnished with a thin film inside that retains the aforementioned electrolyte and supply of the aforementioned electrolyte to the aforementioned electrolyte retention unit may be performed by breaking said film by movability of the aforementioned fuel assembly.

In addition, a tray provided with a hole that retains the fluid and, at the same time, releases droplets in line with the separator can be positioned in the upper part of the aforementioned magnesium fuel assembly and supply of the aforementioned electrolyte to the aforementioned electrolyte retention unit may be performed by said tray.

Furthermore, the aforementioned separator may be shaped so that it protrudes above the battery reaction unit with the aforementioned cathode and magnesium fuel assembly and may be positioned so that said protuberance is adjacent to the hole provided in the aforementioned tray.

The aforementioned magnesium battery may be furnished with a plate-shaped cathode holding member with a hole that holds said cathode while oxygen, the cathode active substance, is introduced from said hole.

Either the aforementioned cathode or aforementioned magnesium fuel assembly or both may be provided with a protective film made of a water-permeable material to protect the surface from friction.

The aforementioned cathode may be positioned between several of the aforementioned magnesium fuel assemblies and each of the aforementioned magnesium fuel assemblies made capable of moving separately.

More than one of the aforementioned magnesium air batteries may be provided, each of which may be installed with a two-stage downward movable structure enabling downward movement of all the aforementioned magnesium batteries after downward movement of the aforementioned fuel assembly and impregnation by the electrolyte accumulated in the aforementioned electrolyte retention unit, so that reaction of the all the vertically-connected aforementioned magnesium air batteries is initiated.

The aforementioned paired cathodes are each set in a parallel arrangement, with the aforementioned magnesium fuel assembly inserted between the aforementioned cathodes, and the aforementioned negative terminal furnished with said magnesium fuel assembly connected to the positive terminal provided with the aforementioned cathode arranged immediately adjacent to the aforementioned cathode with said magnesium fuel assembly in between.

In the foregoing section, at least one of the paired cathodes may be provided with a spacer, which shall be an insulator, to create a space between the aforementioned cathodes.

In addition, the aforementioned cathodes may be shaped so that they are longer than the horizontal length of the aforementioned magnesium fuel assembly and the aforementioned positive terminal installed on the lengthened portion.

The electronic device that relates to the second perspective of the invention shall be provided with the magnesium battery relating to the first perspective of the invention.

In addition, said electronic device shall feature a rechargeable battery, which shall be charged by the aforementioned magnesium battery.

The aforementioned electronic device may be an automobile.

Benefits of Invention

The invention shall enable the supply of electrolyte in the magnesium battery over an extended period of time, enabling provision of an independent magnesium battery capable of long-term supply of electricity and an electronic device.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 These are a sectional side views showing the outline structure of the magnesium air battery relating to Embodiment 1 of the invention (a) and a plane figure viewed from above (b).

FIG. 11 These are a plane figure of the magnesium battery relating to Embodiment 1 of the invention viewed from above (a) and sectional side views (b) and (c).

EMBODIMENTS OF THE INVENTION

Embodiments of the invention are described below with reference to the drawings.

Embodiment 1

Figure 1:
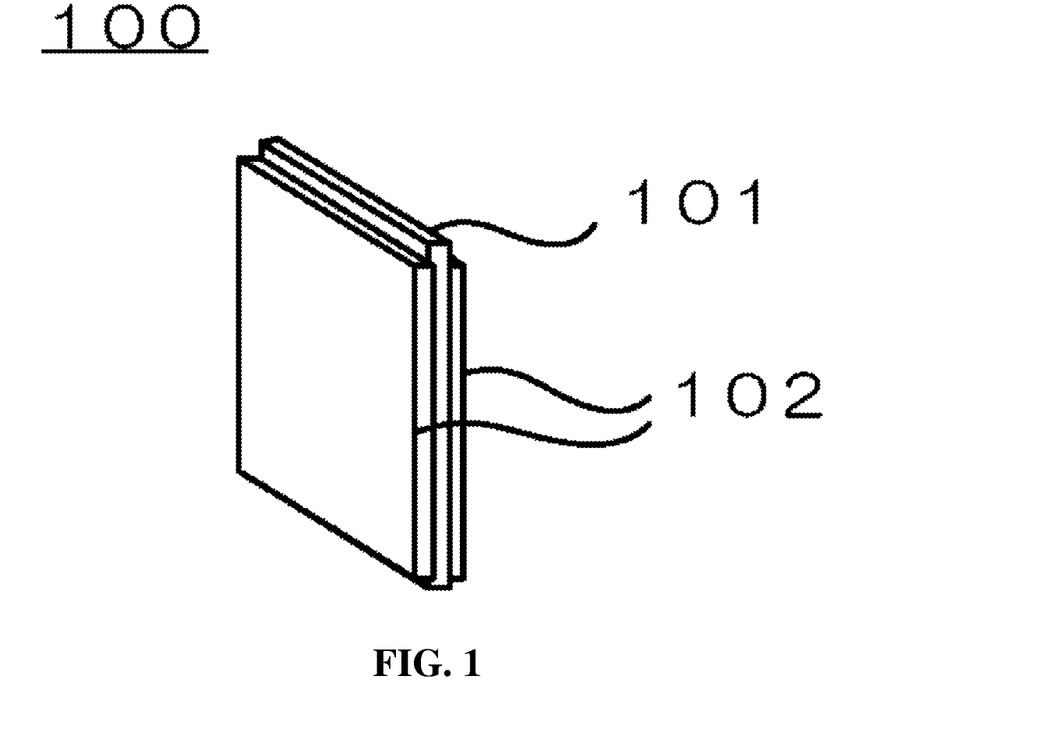
FIG. 1 This is an oblique perspective showing the structure of the magnesium fuel assembly of the invention.

FIG. 1 is an oblique perspective of magnesium fuel assembly 100 that serves as the fuel for the magnesium battery of the invention. Magnesium fuel assembly 100 is furnished with thin magnesium plate 101 and separator 102 that exposes and encloses part of thin magnesium plate 101 from both sides.

Figure 2:
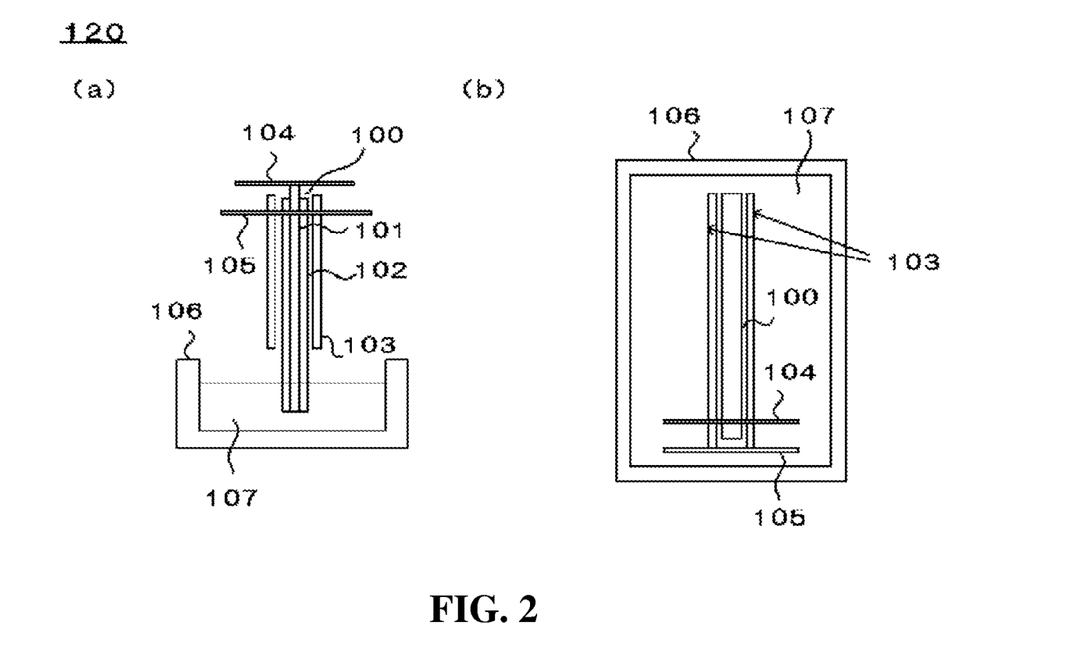

FIG. 2 shows a side view of magnesium battery 120 of the invention (a) and a plane figure viewed from above (b). Magnesium battery 120 is furnished with magnesium fuel assembly 100, cathode 103, electrolyte retention unit 106, electrolyte 107, negative terminal 104 and positive terminal 105. Magnesium battery 120 generates electromotive force using oxygen in the air as cathode active material and magnesium as anode active material.

As shown in FIG. 2, cathode 103 is arranged so that it encloses magnesium fuel assembly 100 from both sides. In this arrangement, positive terminal 105 provided on cathode 103 connects to the outside and functions as the cathode of magnesium battery 120. In addition, negative terminal 104 provided on magnesium fuel assembly 100 connects with the outside and functions as the anode of magnesium battery 120. Cathode 103 may be made of materials such as, but not limited to, carbon, metal, manganese compounds or combinations thereof. Among these, carbon materials such as activated carbon, carbon black, carbon nanotube and carbon felt may be considered.

Thin magnesium plate 101 is a thin plate that contains metal magnesium that acts as the anode active material in magnesium battery 120. Thin magnesium plate 101 is provided with negative terminal 104. Negative terminal 104 is made of conductive material and functions as the negative terminal in magnesium battery 120, electrically connecting to the outside.

Functioning as the separator in magnesium air battery 120, separator 102 exposes negative terminal 104 and wraps it in thin magnesium plate 101. Separator 102 is made of a substance that is liquid-permeable capable of allowing the penetration of ions required for reduction-oxidation reaction. Separator 102 may be made of materials such as, but not limited to, nonwoven fabric or filter paper, felt, carbon felt or combinations thereof. For example, if felt and nonwoven fabric are used, the felt is impregnated with electrolyte while the unwoven fabric helps to prevent cathodes being contaminated by reactive substances deposited in the process battery reaction, thus prolonging the battery life.

Magnesium fuel assembly 100 comprising the aforementioned thin magnesium plate 101 and separator 102 functions as the fuel for magnesium air battery 120.

Made of conductive material, cathode 103 supplies electrons to oxygen in the air that serves as the cathode active material for magnesium air battery 120. Cathode 103 may be made of material including, but not limited to, carbon, metal, manganese compounds or combinations thereof. Cathode 103 is arranged so that it encloses magnesium fuel assembly 100 from both sides, and only magnesium fuel assembly 100 is lowered to the electrolyte retention unit where electrolyte 107 is accumulated, so that cathode 107 is not impregnated with electrolyte 107. In addition, cathode 103 is provided with positive terminal 105. Made of conductive material and functioning as the cathode of magnesium air battery 120, positive terminal 105 is electrically connected to the outside. As shown in FIG. 2(b), in this arrangement, making cathode 103 wider than magnesium fuel assembly 100 (vertical direction in the drawing) makes it easier for multiple cathodes 103 to connect with positive terminal 105.

Provided with a space inside to accumulate electrolyte 107, electrolyte retention unit 106 is positioned in the lower part of magnesium fuel assembly 100. In this arrangement, providing one electrolyte retention unit that is shared by multiple magnesium fuel assemblies 100 simplifies the device. An example of connection of multiple magnesium fuel assemblies 100 will be described later.

Electrolyte 107 is an electrolytic fluid capable of ion exchange between magnesium fuel assembly 100 and cathode 103. Fluids that may be used as electrolyte include, but are not limited to, sodium chloride solution.

Next, the operation of magnesium air battery 120 will be described below.

Figure 3:
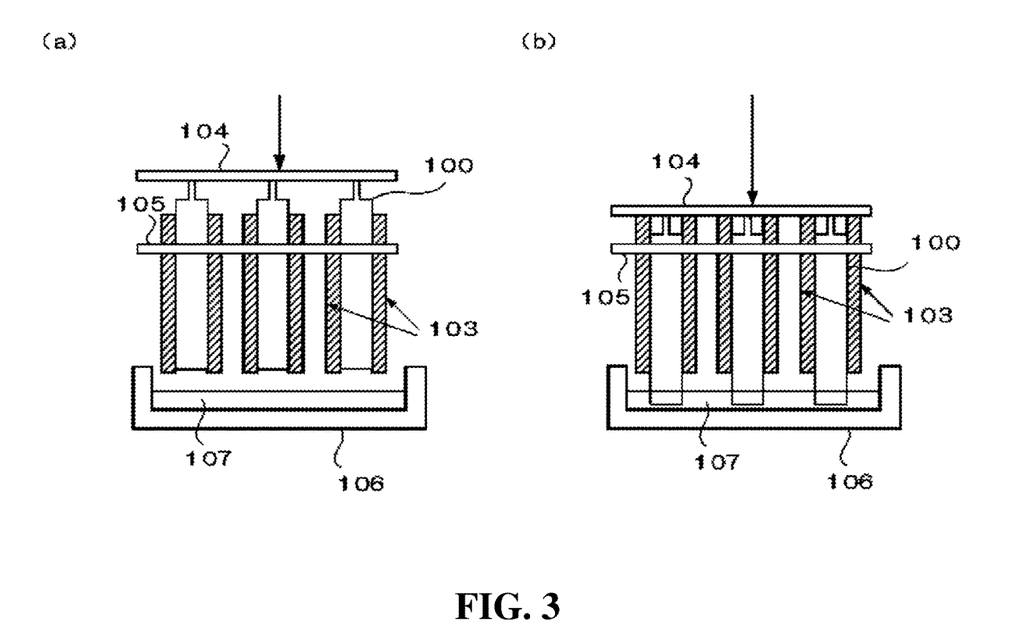
FIG. 3 This is a sectional side view showing the operation of the magnesium battery relating to Embodiment 1 of the invention.

FIG. 3 is a sectional side view showing the operation of magnesium battery 120 illustrating operation before initiation of the battery reaction (a) and operation when the battery reaction is initiated (b) and presents an example of parallel electrical connection of three negative terminals 104 and three positive terminals 105 in magnesium battery 120. In this arrangement, having one electrolyte retention unit shared by parallel-connected magnesium fuel assemblies simplifies the device.

Force applied from outside pushes the entire magnesium fuel assembly 100 connected to negative terminal 104 down in the direction indicated by the arrow in FIG. 3(a). When this happens, only magnesium fuel assembly 100 is pushed down while all other components remain in place (see FIG. 3). Magnesium fuel assembly 100, which has been pushed down far enough to be impregnated with electrolyte 107, permeates separator 102 with electrolyte by capillary action, resulting in ion exchange, while oxidation-reduction reaction takes place with oxygen in the air using magnesium contained in thin magnesium plate 101, thus generating electromotive force. Water is supplied to electrolyte 107 automatically and slowly through capillary action. Magnesium fuel assembly 100 may be pushed down manually, or mechanically from the outside.

Figure 4:
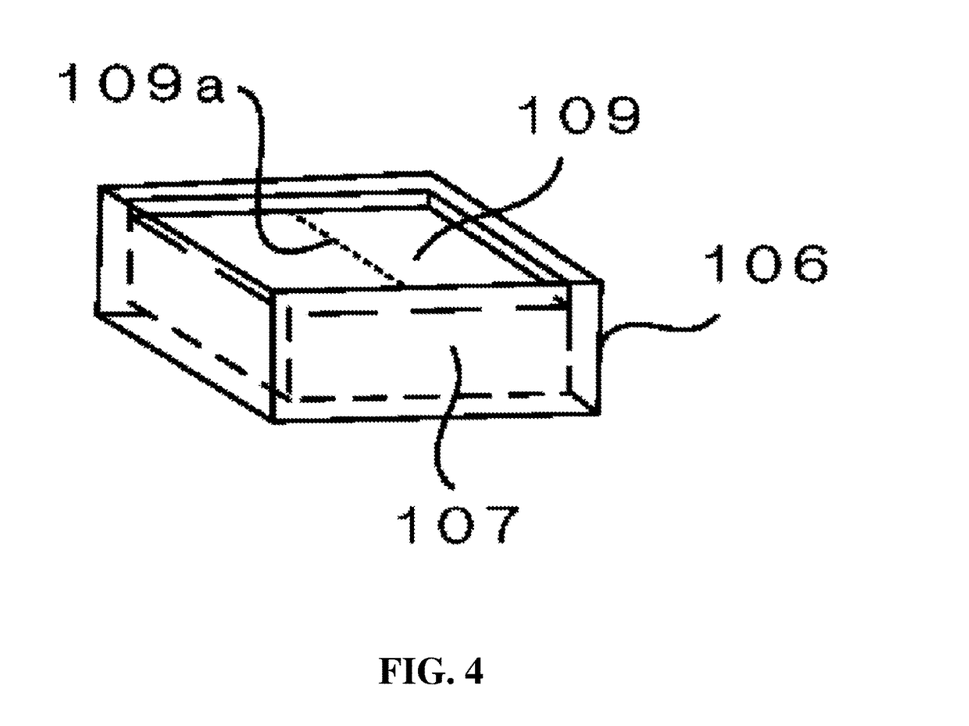
FIG. 4 This is an oblique perspective showing part of the structure of the magnesium battery relating to Embodiments 1 to 1 of the invention.

Incidentally, while it was decided that electrolyte 107 would be accumulated in electrolyte retention unit 106, electrolyte 107 may be supplied to electrolyte retention unit 106 as follows. Electrolyte retention unit 106 is provided with thin film 109 that acts as a lid, and electrolyte 107 is enclosed within the space inside thin film 109. FIG. 4 is an oblique perspective of electrolyte retention unit 106 that shows this arrangement. Enclosure of electrolyte 107 by thin film 109 makes it possible to reduce evaporation and drying of electrolyte 107 until the reaction is initiated. When magnesium fuel assembly 100 is pushed down, thin film 109 breaks, thereby initiating the reaction. To achieve this, making incision 109a in thin film 109 facilitates breakage of the film. Note that structural elements not directly related to this arrangement are omitted from FIG. 4.

Figure 5:
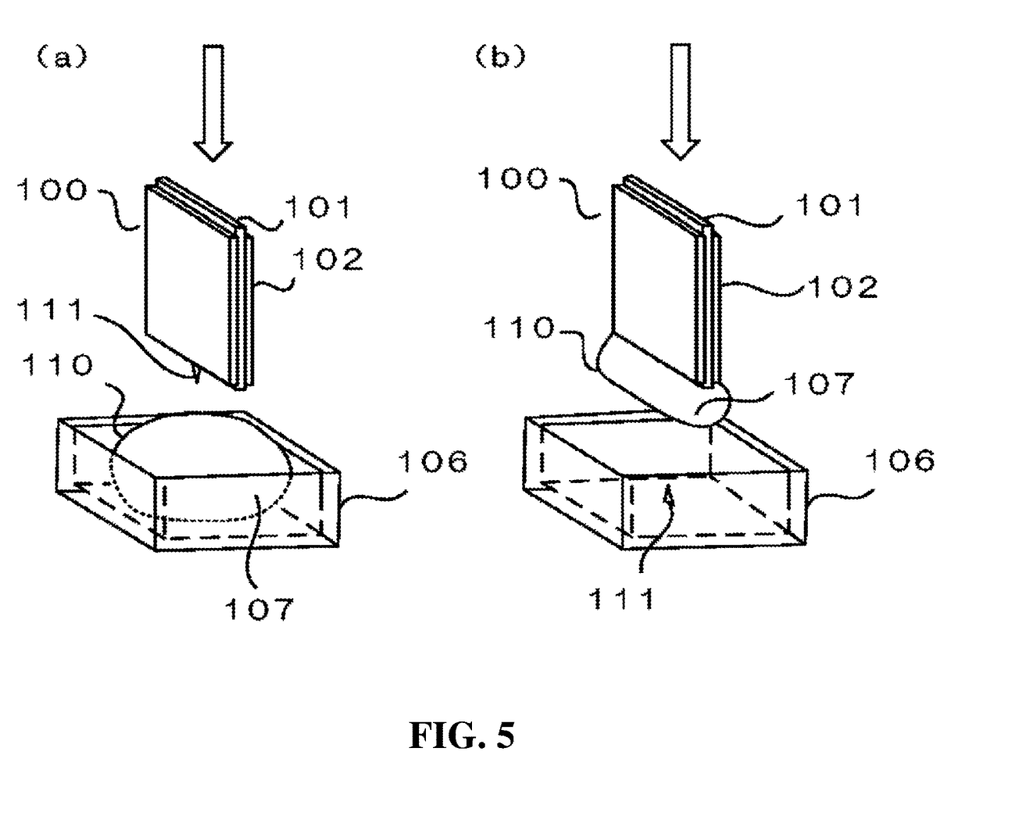
FIG. 5 This is an oblique perspective showing part of the structure of the magnesium battery relating to Embodiments 1 to 1 of the invention.

In addition, as shown in oblique perspective FIG. 5(a), electrolyte 107 may be enclosed in fluid bag 110 formed from the thin film placed in electrolyte retention unit 106. In this arrangement, providing sharp protuberance 111 on the bottom of magnesium fuel assembly will facilitate breakage of fluid bag 110 when magnesium fuel assembly 100 is pushed down. As long as fluid bag 110 is broken, sharp protuberance 111 may take forms such as, but not limited to, a sharp needle or a razor blade.

Alternatively, as shown in FIG. 5(b), fluid bag 110 may be mounted in the bottom part of magnesium fuel assembly 100. In this arrangement, providing protuberance 111 on electrolyte retention unit 106 will facilitate breakage of fluid bag 110. Breakage of fluid bag 110 when magnesium fuel assembly enables contact with electrolysis 107, thereby initiating the reaction.

In this way, accumulation of electrolyte 107 within a space enclosed by a thin film in the form of a lid or fluid bag will reduce evaporation during storage, thus enabling long-term use.

In this way, electrolyte supply is possible over a prolonged period of time, enabling provision of a magnesium battery capable of prolonged supply of electricity.

Embodiment 1 features vertical connection of multiple magnesium batteries 120 in a row, making it possible to increase battery capacity. An example of operation using this arrangement is described below using FIG. 6.

Figure 6:
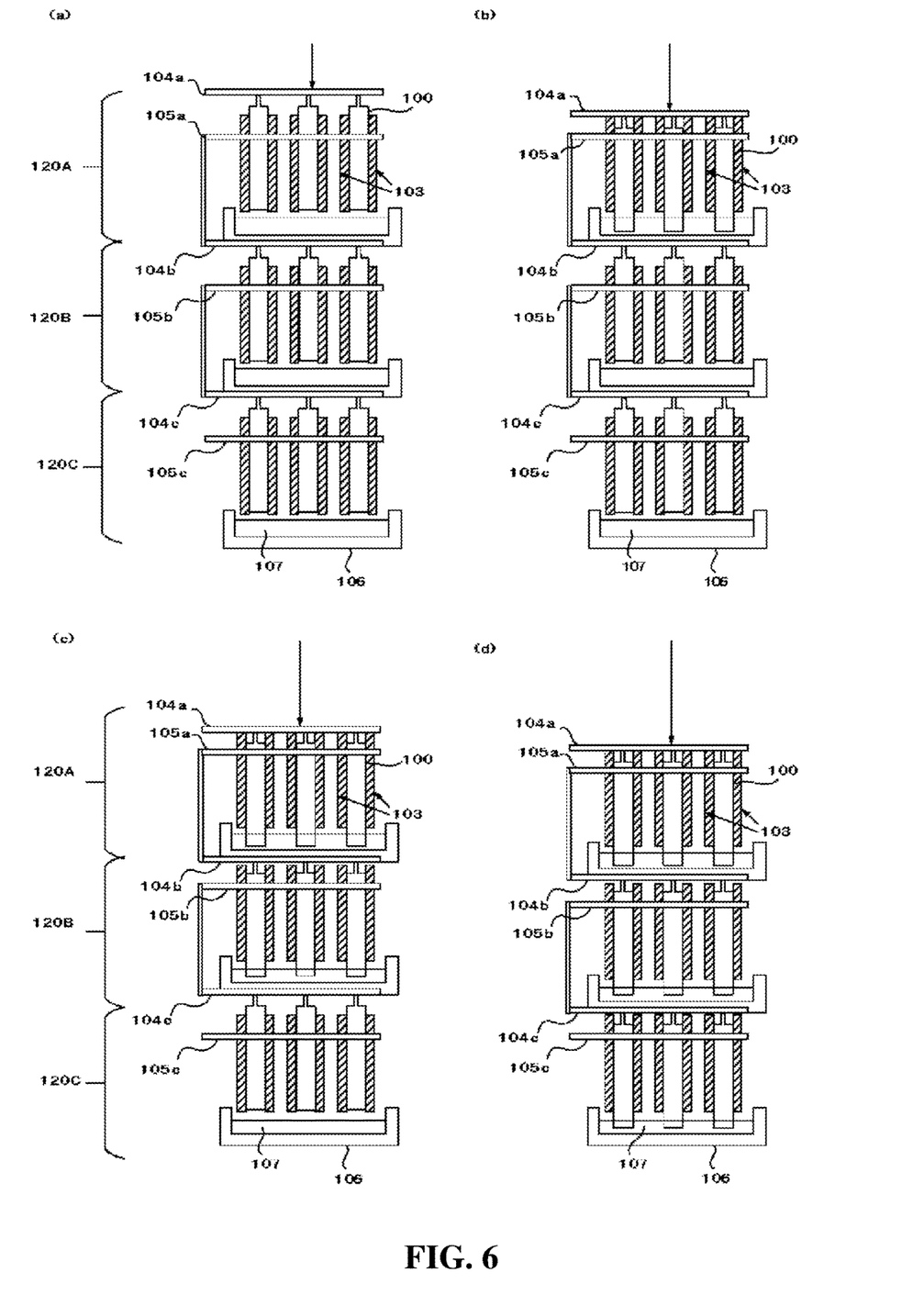
FIG. 6 This is a sectional side view showing the operation of the magnesium battery relating to Embodiment 1 of the invention.

FIG. 6 is a sectional side view showing 1 level, serial connection of 3 groups of magnesium batteries, 120A, 120B and 120C, each group comprising 3 magnesium batteries 120 connected in parallel shown in FIG. 2. Positive terminal 105a of the top level of magnesium batteries 120A and negative terminal 104b of magnesium batteries 120B in the level immediately below are connected, and positive terminal 105b connected to negative terminal 104c of magnesium batteries 120C in the level below that. Negative terminal 104a of the topmost level and positive terminal 105c of the bottommost level are connected to the outside.

Before the reaction is initiated, as shown in FIG. 6(a), none of magnesium batteries 120A to 120C are in contact with electrolyte 107. As shown in FIG. 6(b), magnesium fuel assembly 100 in magnesium air battery 120A in the topmost level is pushed down and reaches electrolyte 107 in electrolyte retention unit 106.

Next, as shown in FIG. 6(c), the entire magnesium battery 120A is pushed down to push down magnesium fuel assembly 100 in magnesium battery 120B immediately below. Then, the entire magnesium battery 120B is pushed down which pushes down magnesium fuel assembly 100 in magnesium battery 120C until it is impregnated with electrolyte 107 (FIG. 6(d)), resulting in successive reaction in magnesium batteries 120 from the topmost level. In other words, providing a 2 stage structure in which magnesium fuel assembly 100 moves, followed by the entire magnesium battery 120 makes it possible to initiate reactions in vertically connected magnesium batteries 120 one after another. In this arrangement, a structure in which the bottom of electrolyte retention unit 106 pushes down on the entire magnesium fuel assembly 100 in magnesium battery 120 in the level below makes it possible to simplify the device. The sequence of initiation of reactions is not limited to that described here. For example, the reaction may be initiated from the bottommost level.

In this way, reactions may be initiated in all magnesium batteries 120A to 120C in the 3 levels.

In this way, electrolyte supply is possible over a prolonged period of time, enabling provision of a magnesium battery capable of prolonged supply of electricity.

Embodiment 2

Figure 7:
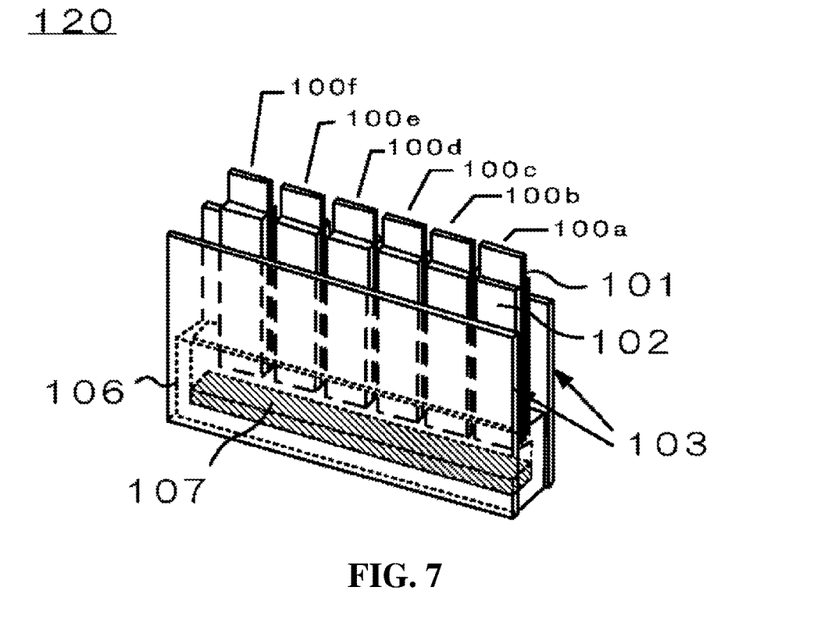
FIG. 7 This is an oblique perspective of the magnesium battery relating to Embodiment 2 of the invention.

FIG. 7 is an oblique outline perspective of magnesium battery 120 in Embodiment 2. Similar to Embodiment 1, magnesium battery 120 is provided with magnesium fuel assemblies 100a to 100f configured with thin magnesium plate 101 and separator 102, cathode 103, electrolyte retention unit 106 and electrolyte 107. In addition, although not shown in the drawing, magnesium fuel assemblies 100 are provided with negative terminals 104, all connected, so that one end functions as an anode. Moreover, cathodes 103 are provided with positive terminals 105, electrically connected to the outside with one end functioning as the magnesium air battery cathode. Descriptions identical to those of Embodiment 1 will be omitted from the following.

Cathode 3 is arranged so that it encloses and is shared by all multiple magnesium fuel assemblies 100a to 100f. Magnesium fuel assemblies 100a-100f are each capable of independent upward and downward movement. In addition, while anode 103 is shown as a single pair, multiple anodes may be used.

Electrolyte 107 is provided inside one electrolyte retention unit 106, which is shared by magnesium fuel assemblies 100a to 100f.

Next, the operation of magnesium battery 120 is described below referring to FIG. 8

Figure 8:
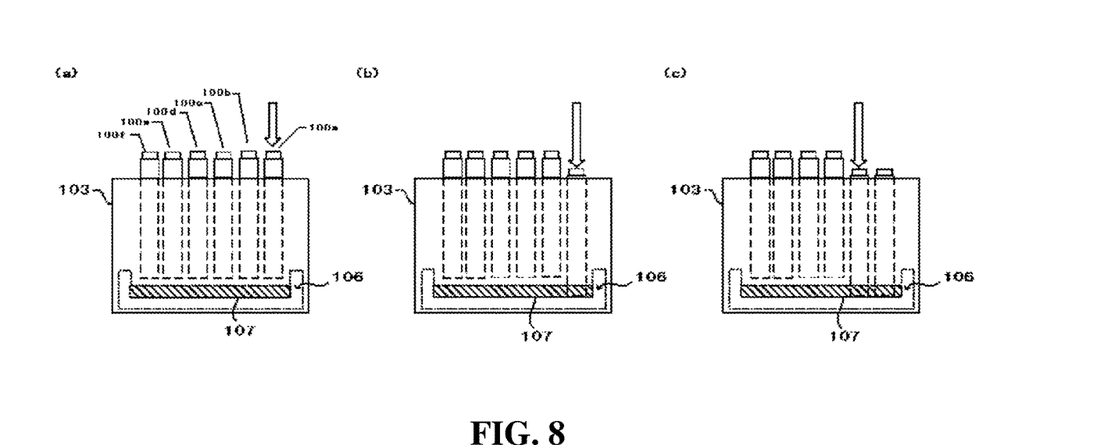
FIG. 8 This is a sectional side view showing the operation of the magnesium battery relating to Embodiment 2 of the invention.

FIG. 8 is a sectional side view of magnesium battery 120 furnished with six magnesium fuel assemblies; i.e. magnesium fuel assemblies 100a to 100f. Before the reaction is initiated, as shown in FIG. 8(a), none of magnesium fuel assemblies 100a to 100f are in contact with electrolyte 107. When magnesium fuel assembly 100a is pushed down (FIG. 8(b)), separator 102 is impregnated with electrolyte 107, thereby initiating the reaction, and consuming thin magnesium plate 101 in magnesium fuel assembly 11a.

Once thin magnesium plate 101 reaction ceases, the battery reaction is temporarily terminated. When necessary, separate magnesium fuel assembly 100b (FIG. 8(c)) may be pushed down to restart reaction at any time, even several years later.

The reaction time of magnesium battery 120 can be adjusted depending on the size of magnesium plate 101 that serves as fuel. This is described below using test results.

Changing the size of thin magnesium plate 101 in magnesium batteries 120 of Embodiments 1 and 2 and measuring the time (sustainable time T) required for voltage to gradually fall to 1V as resistance increased due to the effects of deposition of reactive substances on the plate surface over time revealed that a 1 mm thick, 30 cm wide, 6 cm high thin magnesium plate 101 sustained reaction for 72 hours with a current value of 0.008 A·cm2, or, in other words, 1.44 A. In addition, a 1 cm thick, 6 cm high thin magnesium plate 101 sustained reaction for 2 hours with a current value of 0.25 A/cm2, or, in other words, 5 A, a current value more or less the same as that produced by 72 hour sustained reaction. Here, the width is the length of cathode 103 of thin magnesium plate 101 in the vertical direction of the flat-surface device, while the height refers to the length in the device height direction. As these results show, reaction time can be adjusted by changing the size of thin magnesium plate 101, at the same achieving the required current value, so that the magnesium battery can be made to sustain reaction for 72 hours, for example, or for 2 hours at a time so that it can be used when required.

Figure 9:
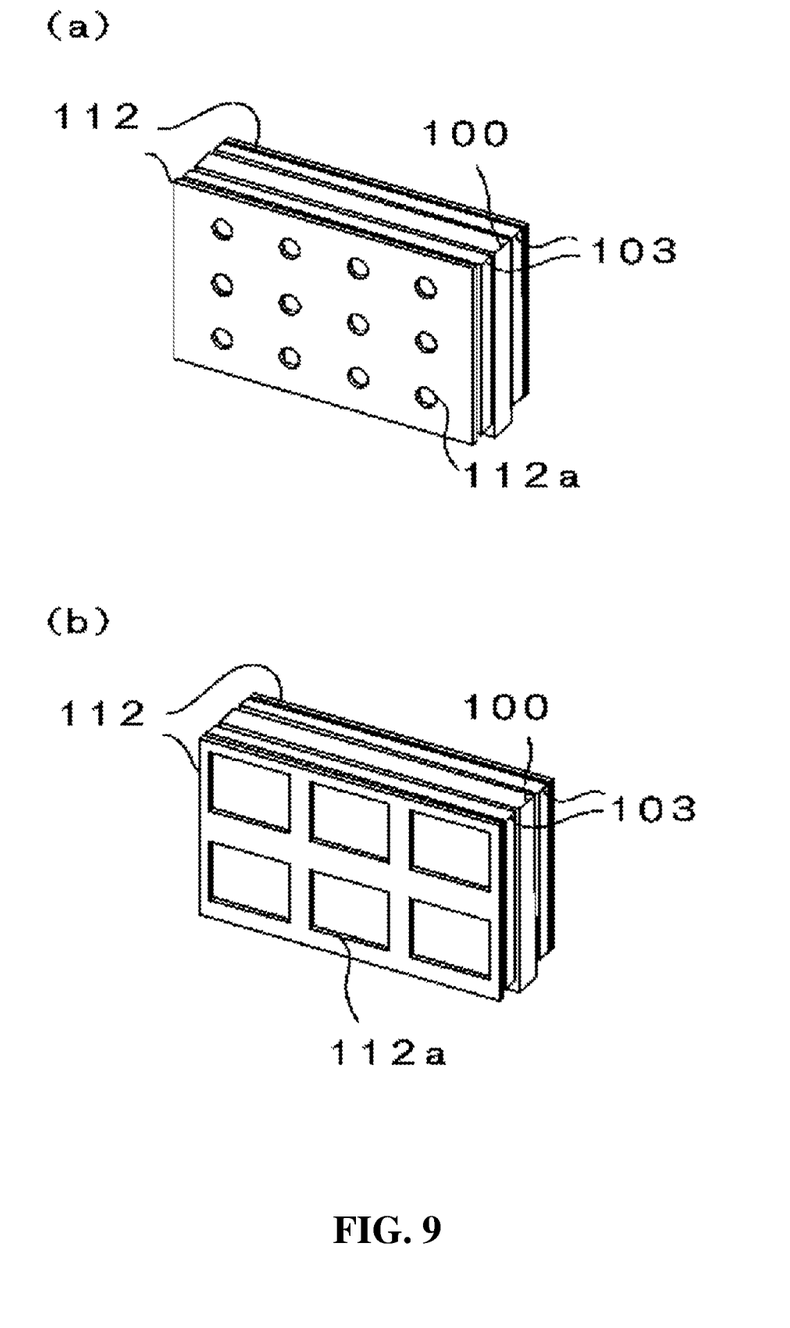
FIG. 9 This an oblique perspective showing part of the structure of the magnesium battery relating to Embodiments 1 to 1 of the invention.

In both Embodiments 1 and 2, cathode 103 may be provided with cathode holding member 112. At the same time as holding cathode 103, cathode holding member 112 is provided with hole 112a for the intake of air on the side in contact with air to facilitate the reaction of cathode 103 using oxygen in the air as cathode reactive material. Provision of cathode holding member 112 makes it possible to realize stable battery reaction while holding cathode 103. In this arrangement, magnesium fuel assemblies 100 may be bundled as a homogenous whole to ensure balanced battery reaction over the entire surface area, and multiple holes 112a may be arranged uniformly to realize a plate-shaped substance. An example of cathode holding member 112 is shown in the oblique perspective in FIG. 9. Possible shapes of hole 112a include, but are not limited to, round (FIG. 9(a)) and rectangular shapes (FIG. 9(b)).

In this way, electrolyte supply is possible over a prolonged period of time, enabling provision of a magnesium air battery capable of prolonged supply of electricity.

Embodiment 3

Figure 10:
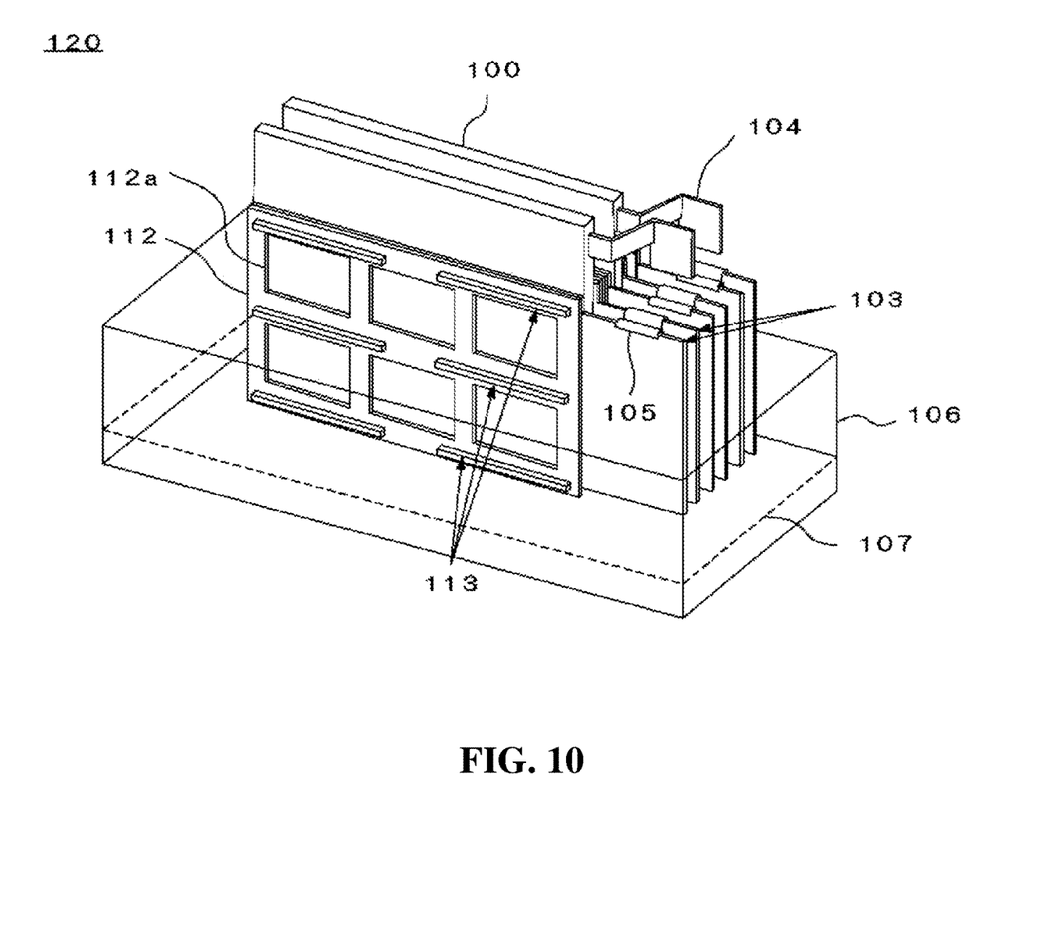
FIG. 10 This is an oblique perspective of the magnesium battery relating to Embodiment 1 of the invention.

As in Embodiments 1 and 2, magnesium air battery 120 in Embodiment 3 is provided with multiple magnesium fuel assemblies 100 configured with thin magnesium plates 101 and separators 102, one pair of cathodes 103 that enclose magnesium fuel assemblies 100, electrolyte retention unit 106 shared by all magnesium fuel assemblies 100 and electrolyte 107. Magnesium fuel assemblies 100 and cathodes 103 are all set in parallel arrangements. FIG. 10 is an oblique perspective of magnesium air battery 120 provided with 2 magnesium fuel assemblies 100, with magnesium fuel assemblies 100 inserted between cathodes 3, and negative terminals 104 provided on the sides of magnesium fuel assemblies 100 inserted in positive terminals 105 provided on cathodes 3, all connected in serial arrangement. (FIG. 10 shows the configuration with terminals not yet inserted). Descriptions of structural elements of the configuration of magnesium air battery 120 identical to those of Embodiments 1 and 2 will be omitted from the following.

A detailed description using FIG. 11(a) follows. FIG. 11(a) is plane figure of magnesium battery 120 of Embodiment 3 viewed from above. Like Embodiments 1 and 2, magnesium fuel assembly 120 is configured with thin magnesium plate 101 enclosed by fluid-permeable separator 102 and provided with negative terminal 104 on its side. Magnesium fuel assembly 100 is inserted between one pair of cathodes 103. In this arrangement, negative terminal 104 (104a) is inserted in positive terminal 105 provided on cathode 103 and electrically connected. Magnesium fuel assembly 100 is pushed down further until it is impregnated with electrolyte 107 in electrolyte retention unit 106 at the bottom. Magnesium fuel assembly 106 that has been depleted by battery reaction is removed from magnesium battery 120 and replaced by a new fuel assembly for use.

Figure 11:
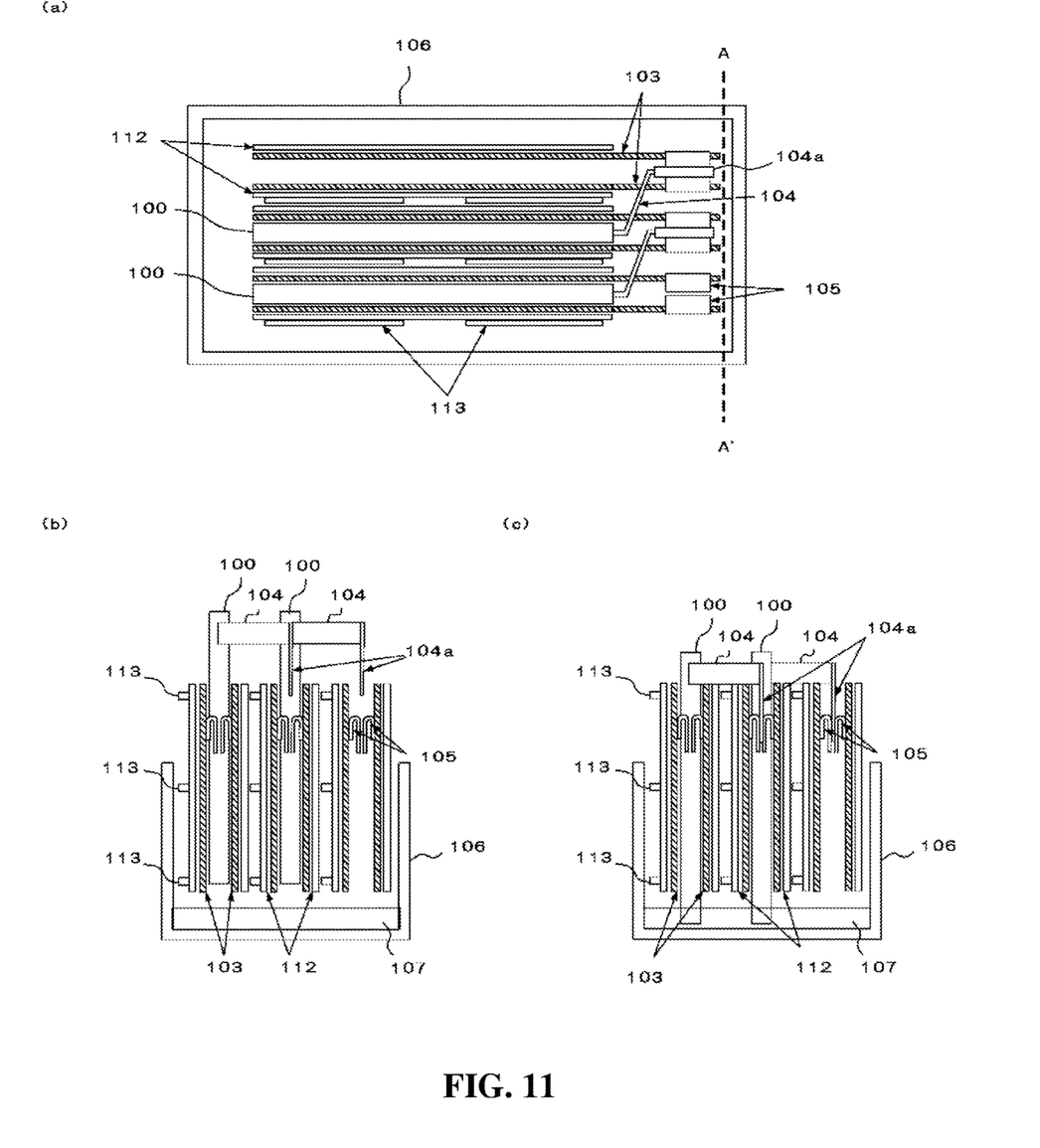
Figure 12:
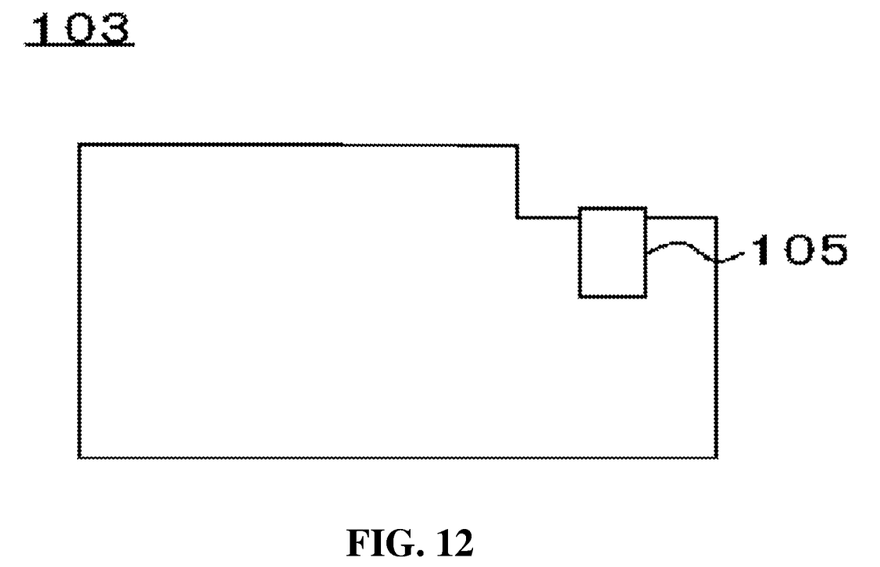
FIG. 12 This is a sectional side view showing part of the structure of the magnesium battery relating to Embodiment 1 of the invention.

As shown in FIG. 11(a), cathodes 103 are arranged so that they enclose each magnesium fuel assembly 100 from both sides and are shaped so that they are longer than the battery reaction portion overlapping magnesium fuel assembly 100. The lengthened portion is provided with positive terminal 105 so that, at the same time as insertion of magnesium fuel assembly 100, negative terminal 104 is inserted in positive terminal 105. In addition, insertion of negative terminal 104 provided on magnesium fuel assembly 100 in positive terminal 105 provided on immediately adjacent cathode 104 makes it possible to simplify the device. In FIG. 10, negative terminal 104 is shaped so that it is bent at an angle toward positive terminal 105 on adjacent cathode 103, making it possible to avoid negative terminal 104 extending from immediately adjacent magnesium fuel assembly 100. In addition, the device can be simplified by providing a space for passage of cathode 103 through this negative terminal 104. An example of the shape of cathode 103 is shown in the side view in FIG. 12. In FIG. 12, the portion of cathode 103 extending beyond magnesium fuel assembly 100 has a notched shape through which negative terminal 104 can pass to be inserted in positive terminal 105 of adjacent cathode 103. Like the other embodiments, cathode 103 is not impregnated with electrolyte. This will be explained later.

Returning to FIG. 11, FIGS. 11(b) and (c) are sectional drawing of A-A', showing magnesium fuel assembly 100 before insertion (b) and after insertion (c). It has been explained that negative terminal 104 provided on magnesium fuel assembly 100 is inserted in positive terminal 105, and FIGSS. 11(b) and (c) show an example of the shape of positive terminal 105. When one pair of cathodes 103 are provided in one cell, if positive terminals 105 provided on each cathode 103 are bent inward so that they form an arch shape, when negative terminal is inserted 104 between positive terminals 105, said positive terminals act as springs, thereby firmly connecting negative terminal 104 and positive terminal 105. Positive terminal 105 is made of material such as copper plate.

Like Embodiments 1 and 2, cathode 103 may be held in place by cathode holding member 112. As described earlier, providing cathode holding member 112 with hole 112a as an air intake makes it possible to arrange cathodes 103 next to each other. In this arrangement, as shown in FIG. 11(b) or FIG. 10, if at least one of cathode holding members 112 that hold the pair of cathodes 103 is arranged to avoid hole 112a and spacer 113 is provided to create a space between cathodes 103, a space for the intake of air can be ensured even if cathodes 103 are set adjacent to each other. Cathode holding member 112 and spacer 113 may be made of the same or different materials, which should preferably be insulators as lightweight as possible. Spacer 113 may be made of materials such as, but not limited to, polycarbonate resin. The places of installation of, and number of spacers 113 are not limited to those shown in FIG. 10 of FIG. 11, but if they are arranged uniformly on cathode 103, air intake will be not blocked even if multiple cathodes 103 are stacked.

Next, the method of use of magnesium battery 120 in Embodiment 3 is described below.

In magnesium battery 120, magnesium fuel assembly 100 that serves as fuel is inserted into cathode 103 and, at the same time, negative terminal 104 is inserted into positive terminal 105. In addition, impregnation of the bottom of magnesium fuel assembly by electrolyte 107 in electrolyte retention unit 106 results in impregnation of the separator by electrolyte 107, thereby initiating the battery reaction.

Incidentally, in this embodiment, while, since multiple magnesium fuel assemblies 100 are connected in series and share the same electrolyte 107, it may be supposed that electrical leakage in electrolyte 107 may occur, resulting in conduction, the results of testing have shown that this is not the case. The copper electrodes such as negative terminal 104 and positive terminal 105 have low resistance while, being an electrolyte, electrolyte 107 has high resistance, and the structure is such that only magnesium fuel assembly 100 is impregnated with electrode 107, with no permeation of cathode 103, ensuring that no current flows in the electrolyte. Accordingly, the structure can be simplified so that the entire magnesium battery 120 shares the same electrolyte retention unit 106.

Magnesium battery in Embodiment 3 is even simpler than those of Embodiments 1 and 2 in so far as magnesium fuel assembly 100 be removed and replaced. The battery is structured so that all other components of magnesium battery 120 are left in place, requiring only that magnesium fuel assembly 100 be replaced, thus further facilitating long-term supply of electricity.

In this embodiment, covering cathode 103 with a protective film protects cathode 103 from damage caused by friction no matter how many times magnesium fuel assembly 100 is removed, thereby prolonging the life of cathode 103. Using a protective film that is made of water-permeable material and is as thin as possible with a smooth surface makes it possible to reduce friction when inserting a new magnesium fuel assembly 100. The film may be made, for example, of thin nonwoven fabric.

Furthermore, like cathode 103, enclosing magnesium fuel assembly 100 from the outside with the protective film described above makes it possible to provide even greater protection against friction and damage.

Figure 13:
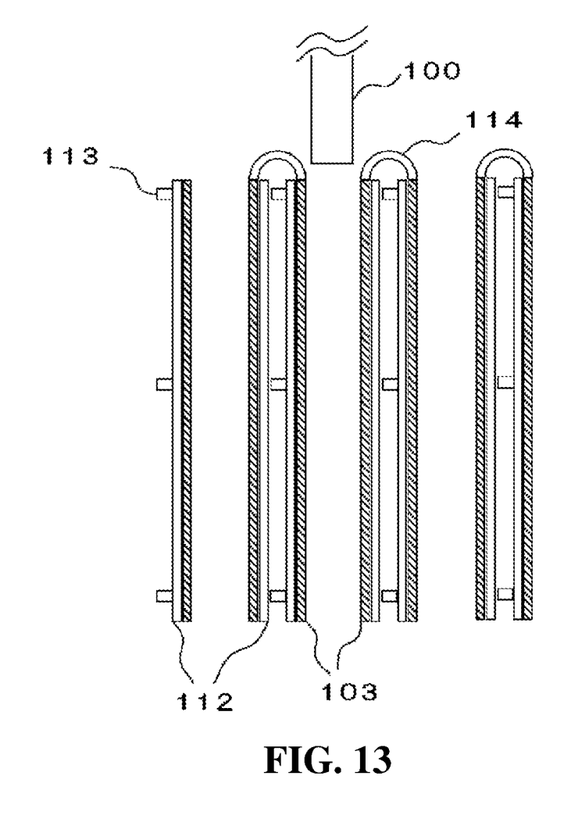
FIG. 13 This is a sectional side view showing part of the structure of the magnesium battery relating to Embodiment 1 of the invention.

In addition, cathode 103 may also be provided with guide 114. Guide 114 is shaped so that, when inserting magnesium fuel assemblies 100 between cathodes 103, it will correct any misalignment of the position of insertion of the bottom of magnesium fuel assembly 100 between cathodes 103 and guide the assembly into the correct position between cathodes 103. Provision of guide 114 facilitates insertion of multiple magnesium fuel assemblies 100. An example of guide 114 is shown in the sectional side view in FIG. 13. Guide 114 may, for example, be semi-cylindrical, in the shape of a cylinder cut in half along its length, so that magnesium fuel assembly 100 is guided in line with the curved cylindrical sides and inserted between cathodes 103. Guide 114 may have shapes such as, but not limited to, the cylindrical shape of a vinyl pipe cut in half along its length. Although guide 114 was made in a semi-cylindrical shape, other shapes are possible. Other shapes, such as a triangular prism, which would enable insertion of magnesium fuel assembly 100 between cathodes 103 in line with the curved sides may also be adopted. Unrelated structural elements have been omitted from FIG. 13.

Like Embodiments 1 and 2, electrolyte 107 may be accumulated under cover of a lid or inside a fluid bag to prolong its useful life.

Incidentally, while it was explained earlier that electrolyte 107 is supplied to electrolyte retention unit 106 by breaking the film in which electrolyte 107 is enclosed and magnesium fuel assembly 100 is impregnated by electrolyte 107 through the capillary action of separator 102, supplying electrolyte 107 from the top of magnesium fuel assembly 100 makes it possible to accelerate supply of electrolyte 107 and initiation of the battery reaction.

Figure 14:
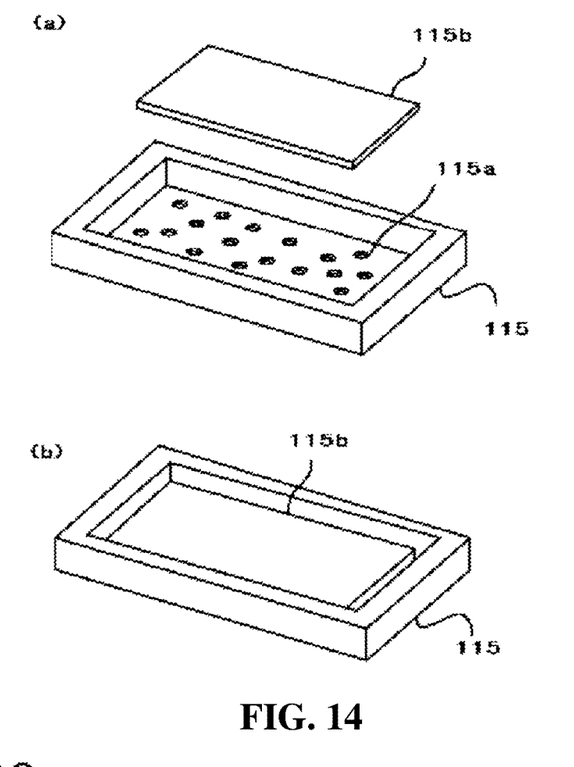
FIG. 14 This is an oblique perspective showing part of the structure of the magnesium battery relating to Embodiment 1 of the invention.

As shown in FIG. 14(a), tray 115 is provided on the top of magnesium fuel assembly 100 of magnesium battery 120. Tray 115 is shaped so that it is able to hold fluid and is provided with multiple drip holes 115a from which fluid can be dripped. Before the battery reaction is initiated, electrolyte 107 in tray 115 drips along separator 102 through drip holes 115a. Subsequently, impregnation of magnesium fuel assembly 100 by electrolyte 107 initiates the battery reaction. As shown in FIG. 14(b), in this arrangement, the tray is made of fluid-permeable material and provided with electrolyte holding member 115b and permeation of electrolyte holding member 117b with electrolyte 107 results in gradual dripping of electrolyte 107, facilitating permeation of separator 102. Electrolyte holding member 115b may be made of materials such as, but not limited to, nonwoven fabric or felt. In addition, while it has been explained that tray 115 holds electrolyte 107, it may hold water instead and separator 102 may be provided with sodium chloride, producing a sodium chloride solution when dissolved in water, which may be used as electrolyte 107. Drip holes 115a may be round but may also have other shapes. For example, drip holes 115a may be slits or rectangular-shaped.

Figure 15:
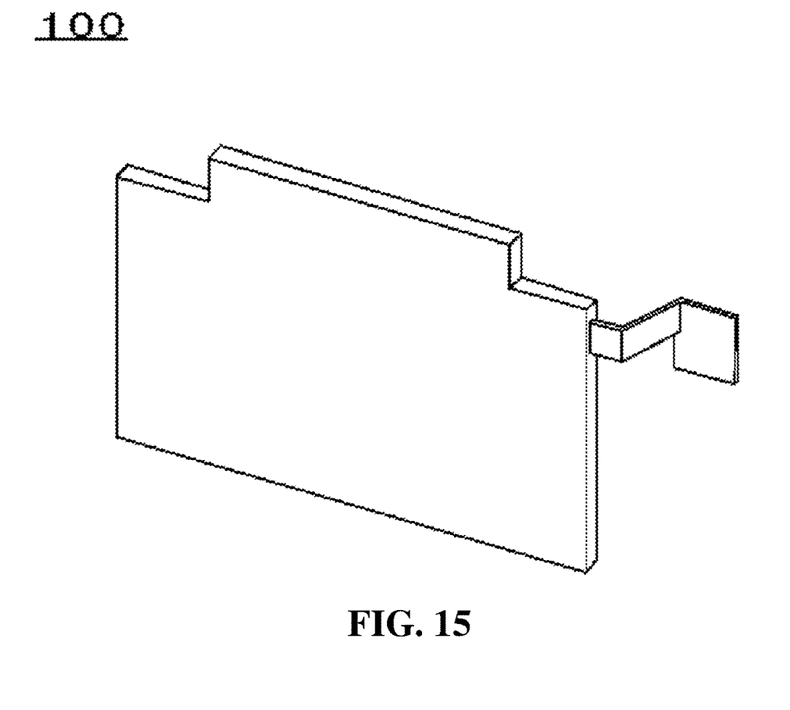
FIG. 15 This is an oblique perspective showing part of the structure of the magnesium battery relating to Embodiment 1 of the invention.

Here, separator 102 may be shaped as shown in FIG. 15. FIG. 15 is an oblique perspective of magnesium fuel assembly 100, where separator 102 is shaped to protrude from the reactive section of magnesium fuel assembly 100 and cathode 103, with the protuberance arranged so that is adjacent to, or in contact with drip holes 115a in tray 115, so that fluid dripping from drip holes 115a permeate magnesium fuel assembly 100 via separator 102, thereby supplying electrolyte 107. As described earlier, the fluid held in tray 115 may be electrolyte 107 or water, and, if water, separator 102 must be provided with sodium chloride, as explained before.

Thus, supplying electrolyte 107 from the top of magnesium fuel assembly 100 makes it possible to accelerate the supply of electrolyte 107.

In this way, electrolyte supply is possible over a prolonged period of time, enabling provision of a magnesium battery capable of prolonged supply of electricity.

Embodiments 1 to 3 have been described above, and, because they enable prolonged supply of electric power, they can be connected to all kinds of electronic equipment and devices as power sources. A method of use of magnesium battery 120 as with devices such as automobiles characterized by large fluctuations in output by actions such as stopping and moving is described below.

Figure 16:
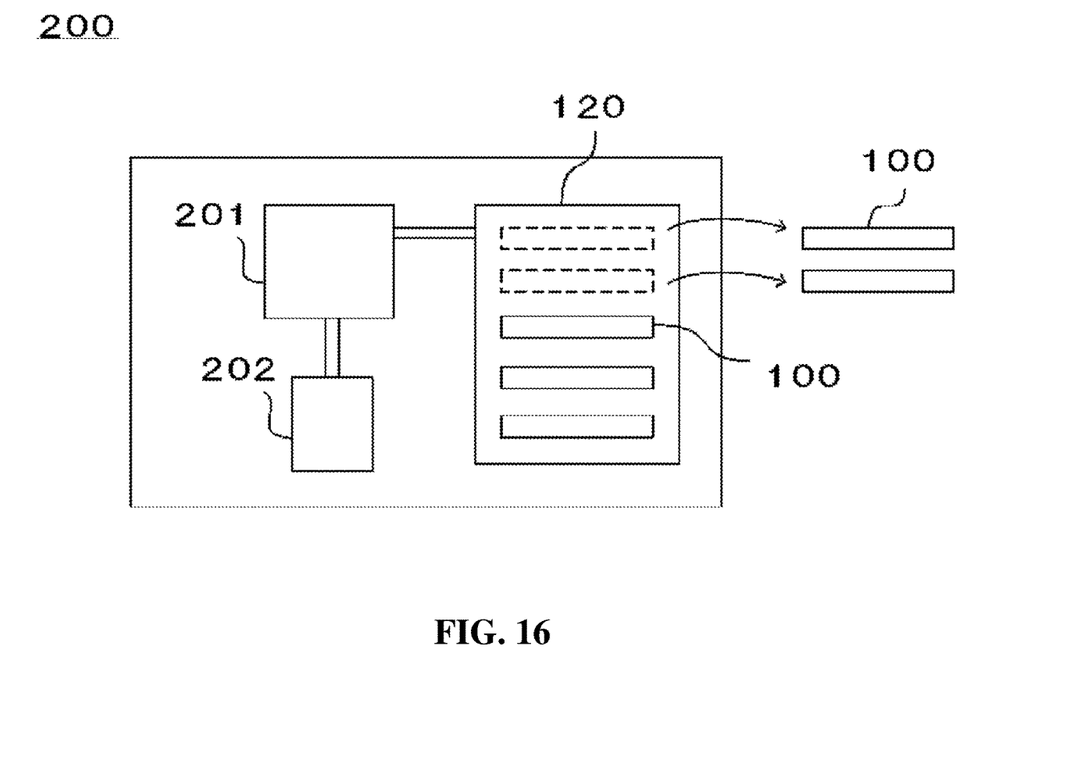
FIG. 16 This is a plane figure showing the outline structure of the vehicular device relating to Embodiment 1 of the invention.

FIG. 16 is an outline drawing of vehicular device 200 using magnesium battery 120. Vehicular device 200 is provided with magnesium battery 120, rechargeable battery 201 and motor 202. As shown in FIG. 16, magnesium battery 120 is connected to rechargeable battery 201, which is connected to motor 202. The arrow in FIG. 16 indicates that magnesium fuel assembly 100 in magnesium battery is replaceable. Vehicular device 200 is driven by rechargeable battery 201, which is recharged by magnesium battery 120.

Vehicular device 200 runs by operating motor 202 using motive power from rechargeable battery 201 and for example, may be an electric vehicle.

Rechargeable battery 201 is a battery capable of being recharged and for example, may be a rechargeable lithium-ion battery. Rechargeable battery 201 is the direct power source that drives vehicular device 201.

Vehicular device 200 runs by operating motor 202 using electric power supplied by rechargeable battery 201. In this arrangement, rechargeable battery 201 is charged by magnesium battery 120, to which it is connected, while vehicular device 200 is stationary or traveling. Because magnesium fuel assembly 100 in magnesium battery 120 is replaceable, it can charge rechargeable battery 201 without being removed from vehicular device 200. Note that motor 202 is, for example, a drive device that moves the wheels that enable vehicular device 200 to travel.

Incidentally, vehicular devices such as automobiles are characterized by large fluctuations in output resulting, for example, from frequent traveling and stopping. If used as a direct power source for vehicular device 200, output from magnesium air battery 120 will fluctuate accordingly. When this happens, switching from high to low output and again trying to gain high output will result in accumulation of reaction products such as magnesium hydroxide or other insulators on the surface of the magnesium plate that serves as fuel, gradually inhibiting the flow of current and, in addition, leading to adherence of such substances once the reaction stops, making it difficult to restart the reaction. For this reason, because, when changing from low to high output, output must be increased gradually over time and, in addition, problems may occur such as inability to increase to high output after output has been lowered too much, magnesium battery 120 would not be efficient as a direct power source for vehicular device 200. On the other hand, while a rechargeable battery that has been exhausted by travel can be used again to run a vehicle, the time taken to recharge such batteries at filling stations presents a problem. By adopting hybrid structure using magnesium battery 120 and rechargeable battery 201 in vehicular device 200, the two batteries each compensate the other for their mutual deficiencies, making it possible for the vehicle to run for a longer time and reducing the amount of time stopped for charging.

The embodiments of the invention are, but not limited to, those described above.

Thin magnesium plate 101 contains substances such as, but not limited to, metal magnesium. In other words, magnesium fuel assembly 100 should be capable of elution of magnesium ion. Thin magnesium plate 101 may be made of materials such alloys containing magnesium or magnesium compounds.

DESCRIPTION OF SYMBOLS 100, 100a-100f: Magnesium fuel assembly
101: Thin magnesium plate 102: Separator
103: Cathode
104, 104a-104c: Negative terminal
105, 105a-105c: Positive terminal
106: Electrolyte retention unit
107: Electrolyte
109: Thin film
109a: Incision
110: Fluid bag
111: Protuberance
112: Cathode holding member
113: Spacer
114: Guide
115: Tray
115a: Drip hole
115b: Electrolyte holding member
120, 120A-120C: Magnesium battery
200: Vehicular device
201: Rechargeable battery
202: Motor

The invention claimed is:

1. A magnesium battery, comprising:
a magnesium fuel assembly comprising a magnesium plate attached to a negative terminal;
the magnesium fuel assembly further comprising a first separator in contact with a side of the magnesium plate and a second separator in contact with an opposite side of the magnesium plate, each separator comprised of fluid and ion-permeable material;
a cathode pair having a positive terminal and arranged to enclose the magnesium fuel assembly on two or more sides, the magnesium fuel assembly movable separate from the cathode pair;
wherein a surface of a cathode, of the cathode pair, facing the magnesium fuel assembly or a surface of the magnesium fuel assembly facing the cathode is protected from friction from movement of the magnesium fuel assembly by a protective film made of water-permeable material;
electrolyte and an electrolyte retention unit with a space inside in which the electrolyte is stored;
wherein two or more magnesium fuel assemblies share the electrolyte retention unit.

2. The magnesium battery as recited in claim 1, wherein when the magnesium fuel assembly is moved, separate from the cathode pair, into contact with the electrolyte, the first separator and the second separator material allow permeation of the electrolyte by capillary action.

3. The magnesium battery as recited in claim 1 wherein the electrolyte is contained within a fluid bag and the electrolyte is supplied to the electrolyte retention unit by breakage of the fluid bag by movement of the magnesium fuel assembly.

4. The magnesium battery as recited in claim 1, further comprising a tray at the top of the magnesium fuel assembly, configured to hold fluid that drips through holes in the tray along at least the first separator, thereby supplying the electrolyte to the electrolyte retention unit.

5. The magnesium battery as recited in claim 4, wherein the first separator is shaped so that it protrudes over a segment of the magnesium plate where battery reaction takes place between the cathode and the magnesium fuel assembly, with the holes in the tray and the protruding shape arranged in close proximity.

6. The magnesium battery as recited in claim 1, further comprising a plate-shaped cathode holding member with holes to hold one cathode of the cathode pair while taking in oxygen that serves as the one cathode active material through the holes.

7. The magnesium battery as recited in claim 1, wherein the cathode pair is arranged so that it encloses more than one of the magnesium fuel assemblies, each of more than one of the magnesium fuel assemblies is independently movable.

8. The magnesium battery as recited in claim 1, wherein two or more magnesium air batteries are arranged in a two stage structure so that, after a first magnesium fuel assembly has moved downward and becomes impregnated with electrolyte accumulated in a first electrolyte retention unit, the first magnesium air battery moves downward to cause a second magnesium fuel assembly to become impregnated with electrolyte accumulated in a second electrolyte retention unit, thereby successively initiating reaction in each of the magnesium air batteries, which are connected in vertical arrangement.

9. The magnesium battery as recited in claim 1, further comprising multiple pairs of cathodes, each in a parallel arrangement, the multiple pairs of cathodes include the cathode pair with the magnesium fuel assembly inserted between the cathode pair and the negative terminal attached to the magnesium fuel assembly connected in series to the positive terminal of an adjacent cathode pair.

10. The magnesium battery as recited in claim 9, wherein at least one of the pairs of cathodes of the multiple pairs of cathodes includes a spacer, which is an insulator, to create a space between the at least one of the pairs of cathodes and another cathode pair.

11. The magnesium battery as recited in claim 9, wherein the cathode pair is shaped so that it is longer than the horizontal length of the magnesium fuel assembly, with a lengthened segment provided with the positive terminal.

* * * * *